United States Patent [19]

Hikasa et al.

[11] Patent Number: 5,308,700
[45] Date of Patent: May 3, 1994

[54] THERMOPLASTIC ELASTOMER POWDER FOR POWDER MOLDING, POWDER MOLDING METHOD USING THE SAME AND MOLDED ARTICLE THEREOF

[75] Inventors: Tadashi Hikasa, Kimitsu; Hiroaki Mendori; Tatsuo Hamanaka, both of Ichihara; Toshio Igarashi, Kyoto; Yuu Shida, Takatsuki, all of Japan

[73] Assignee: Sumitomo Chemical Company Limited, Osaka, Japan

[21] Appl. No.: 769,734

[22] Filed: Oct. 2, 1991

Related U.S. Application Data

[63] Continuation-in-part of Ser. No. 636,114, Dec. 31, 1990, abandoned.

Foreign Application Priority Data

Oct. 3, 1990 [JP] Japan ................................ 2-267299
Aug. 8, 1991 [JP] Japan ................................ 3-199589

[51] Int. Cl.$^5$ .................. C08L 23/26; C08L 23/16
[52] U.S. Cl. .................................... 428/402; 525/193; 525/194; 525/240; 525/106; 524/261; 524/269; 264/310; 264/331.17
[58] Field of Search ............ 525/193, 194, 240; 428/402

[56] References Cited

U.S. PATENT DOCUMENTS

| | | | |
|---|---|---|---|
| 2,992,201 | 7/1961 | Gover, Jr. .................. | 524/269 |
| 3,399,156 | 8/1968 | Bell, Jr. ..................... | 524/269 |
| 3,758,643 | 9/1973 | Fischer ...................... | 525/240 |
| 3,811,903 | 5/1974 | Daskivich .................. | 524/269 |
| 4,130,535 | 12/1978 | Coran et al. ............... | 525/194 |
| 4,267,080 | 5/1981 | Yokoyama et al. ........ | 525/194 |
| 4,319,004 | 3/1982 | Spielau et al. ............. | 525/240 |
| 4,748,206 | 5/1988 | Nogiwa et al. ............. | 525/240 |

FOREIGN PATENT DOCUMENTS

| | | |
|---|---|---|
| 0087210 | 3/1983 | European Pat. Off. . |
| 0338860 | 10/1989 | European Pat. Off. . |
| 58-132507 | 8/1983 | Japan . |
| 2-57309 | 2/1990 | Japan . |
| 2-57310 | 2/1990 | Japan . |

OTHER PUBLICATIONS

Derwent Publications Ltd., AN 90-104961 & JP 2-057309, Feb. 1990 Abstract.
Derwent Publications Ltd., AN 90-104962 & PJ 2-057310, Feb. 1990 Abstract.
Kaufman, et al., "Introduction to Polymer Science and Technology: An SPE Textbook", Oct. 185, p. 556.

*Primary Examiner*—Carman J. Seccuro, Jr.
*Attorney, Agent, or Firm*—Cushman, Darby & Cushman

[57] ABSTRACT

A thermoplastic elastomer powder for powder molding, comprising an elastomer composition of an ethylene-α-olefin copolymer rubber and a polyolefin resin, wherein said elastomer composition has a complex dynamic viscosity $\eta^*(1)$ as measured at frequency of 1 radian/sec. in dynamic viscoelasticity measurement at 250° C., of $1.5 \times 10^5$ poise or less, a Newtonian viscosity index n calculated from the following formula by using the complex dynamic viscosity $\eta^*(1)$ at a frequency of 1 radian/sec. and the complex dynamic viscosity $\eta^*(100)$ at a frequency of 100 radian/sec. of 0.67 or less, and a hardness (shore D) of 45 or less:

$$n = \{\log \eta^*(1) - \log \eta^*(100)\}/2.$$

15 Claims, No Drawings

THERMOPLASTIC ELASTOMER POWDER FOR POWDER MOLDING, POWDER MOLDING METHOD USING THE SAME AND MOLDED ARTICLE THEREOF

CROSS-REFERENCE OF RELATED APPLICATION

This application is a continuation in-part of Ser. No. 636 114 filed Dec. 31, 1990, now abandoned.

BACKGROUND OF THE INVENTION

1. Field of the Invention

The present invention relates to an olefin type thermoplastic elastomer powder for powder molding and a powder molding method using the same and a molded article thereof. More specifically, it relates to a thermoplastic elastomer powder for a powder molding process such as a powder rotational molding, and suitable for use, in particular, as covering materials and housings for molded articles in various fields, regardless of the backing material used, a powder molding method using the same and a molded article thereof.

2. Description of the Related Art

With regard to covering materials used as interior decorative materials of automobiles, there is an increasing demand for those which have a light weight and a good and soft feeling, and which can be given an embossed pattern or stitch pattern to increase the value of molded articles. Also, during the scrapping of cars, acidic substances are generated by a combustion of such interior decorative materials to cause a contamination of the air, and thus create serious social problems such as acid rain, etc., and therefore, there is a strong demand for non-polluting materials.

Known covering materials of the prior art are vacuum molded olefin type thermoplastic elastomer (hereinafter called TPO) sheets and vacuum formed sheets composed mainly of vinyl chloride resins and ABS resins, or rotation molded or slush molded sols composed mainly of vinyl chloride resins for paste and plasticizers (hereinafter called sol molding).

Vacuum formed TPO sheets attain the objects to provide a light weight and non-polluting material, but it is difficult to impart complicated shapes thereto.

Also, vacuum formed sheets contain a high residual molding stress caused during the forming process, and thus have a drawback in that cracks will appear after long term usage.

Vacuum formed sheets composed mainly of vinyl chloride resins and ABS resins have drawbacks similar to those of vacuum formed TPO sheets, in that it is difficult to impart complicated shapes thereto, and further that, compared with TPO sheets, they have the drawback of heavier weight and cause pollution.

Sol moldings composed mainly of vinyl chloride resins for paste and plasticizers give a soft feeling, and complicated shapes can be imparted thereto. However since the gellation temperature is low, they meltrapidly while being molded, and thus many drawbacks arise, for example, problems in the processing such as flow marks, lip or the sol fiber-forming phenomenon, the inherent problems of vinyl chloride such as a heavier weight and pollution, and further problems in that the inner window glass of the automobiles produced from said sol molding suffers from hazy appearance due to the use of a large amount of plasticizers.

Due to these drawbacks and problems of the known molding methods, powder molding methods have recently attracted attention.

Powder molding methods include, in general, a flow dipping method, an electrostatic coating method, a flame spray coating method, and a powder rotational molding method, and particularly for producing interior decorative materials for automobiles, the powder rotational molding method is suitable.

A partially crosslinked TPO composition is known from Japanese Unexamined Patent Publications (Kokai) Nos. 48-26838, 53-149240, but the known molding methods currently used for the partially crosslinked TPO are:

a) injection molding (shear rate during processing: $\dot{\gamma} \geqq 10^3\ sec^{-1}$);
b) extrusion molding ($10^1 \leqq \dot{\gamma} \leqq 10^2\ sec^{-1}$);
c) calendering ($10^2 \leqq \dot{\gamma} \leqq 10^3\ sec^{-1}$);
d) compression molding of the primarily processed product in b. or c.; and
e) vacuum forming of the primarily processed product in b. or c., but all of these methods require the molding temperatures are higher or equal to the softening point, and the molding pressures must be varied depending on the viscosities and the shear rates corresponding to the respective processing conditions.

Nevertheless, in the molding method such as a powder molding at a shear rate of $10^0\ sec^{-1}$ or less or under an approximately stationary state of the polymer, at a vibration frequency of 1 radian/sec., and with no application of a pressure or under a very low pressure ($\leqq 1\ kg/cm^2$), the flowability becomes extremely poor, and accordingly, the molding becomes very difficult. Further, even if a molding is possible, the poor flowability in the low shear rate region cause an incomplete thermal fusion between the powder particles, and only molded articles with a low mechanical strength can be obtained.

For this reason, for example, Japanese Unexamined Patent Publication (Kokai) No. 2-57309 discloses the following inventions:

"1) An embossed thermoplastic elastomer molding, having an emboss pattern formed on the surface by melting a thermoplastic elastomer powder comprising a polyolefin resin and an ethylene-α-olefin copolymer rubber into a flowing plasticized state in a roating and heated mold with an emboss pattern.

2) A method of preparing a thermoplastic elastomer molding, which comprises introducing a thermoplastic elastomer powder comprising a polyolefin resin and an ethylene-α-olefin copolymer rubber into a mold with an emboss pattern, followed by sealing the mold, then melting the thermoplastic elastomer powder by roating and heating the mold into a flowing plasticized state, and subsequently cooling the mold to obtain a thermoplastic elastomer molding having an emboss pattern on the surface." Namely, this is an example of how to obtain a TPO molding by a powder rotational molding, in which TPO with a low flowability in the low shear rate region is melted and adhered, while in a flowing plasticized state, to the inner surface of the mold which is rotated and heated.

According to this method, however, the flowability of TPO powder in the low shear rate region is still poor, and therefore, the thermal fusion strength between powder particles is too low, causing a problem that pinholes, etc. may be formed, and a molding having a fully satisfactory appearance and physical properties, etc., has not been obtained.

SUMMARY OF THE INVENTION

An object of the present invention is to solve the above problems and provide a thermoplastic powder for a powder molding which has a high flowability even when substantially no forming pressure is applied, by which a molding having a required high thermal fusion strength between powder particles can be obtained without pinholes, a powder molding method using the same, and a molded article thereof.

Other objects and advantages of the present invention will be apparent from the following description.

1) In accordance with the present invention, there is provided a thermoplastic elastomer powder for powder molding comprising an elastomer composition of an ethylene-α-olefin copolymer rubber and a polyolefin resin, wherein said elastomer composition has a complex dynamic viscosity $\eta^*$ (1) as measured at a frequency of 1 radian/sec. in a dynamic viscoelasticity measurement at 250° C., of $1.5 \times 10^5$ poise or less, a Newtonian viscosity index n calculated from the following formula by using the complex dynamic viscosity $\eta^*(1)$ at a frequency of 1 radian/sec. and the complex dynamic viscosity $\eta^*(100)$ at a frequency of 100 radian/sec. of 0.67 or less, and a hardness (shore D) of 45 or less:

$$n = \{log\eta^*(1) - log\eta^*(100)\}/2.$$

2) In accordance with the present invention, there is also provided a thermoplastic elastomer powder for powder molding, comprising a partially crosslinked type elastomer composition comprising a mixture of an ethylene-α-olefin copolymer rubber and a polyolefin resin dynamically crosslinked in the presence of a crosslinking agent, wherein said elastomer composition has a complex dynamic viscosity $\eta^*(1)$ as measured at a frequency of 1 radian/sec. in dynamic viscoelasticity measurement at 250° C., of $1.5 \times 10^5$ poise or less, a Newtonian viscosity index n calculated from the following formula by using the complex dynamic viscosity $\eta^*(1)$ at a frequency of 1 radian/sec. and the complex dynamic viscosity $\eta^*(100)$ at a frequency of 100 radian/sec. of 0.67 or less, and a hardness (shore D) of 45 or less:

$$n = \{log\eta^*(1) - log\eta^*(100)\}/2.$$

3) In accordance with the present invention, there is further provided a thermoplastic elastomer powder for powder molding as defined in 2) above, wherein a crosslinking coagent is used in combination in the dynamic crosslinking.

4) In accordance with the present invention, there is further provided a powder molding method using a thermoplastic elastomer powder as defined in 1), 2) or 3) above and the molded article thereof.

DESCRIPTION OF THE PREFERRED EMBODIMENTS

According to the present invention, by utilizing the specific features of the powder molding method which can form moldings with a small residual molding stress, a low hardness and a complicated shape, covering materials, particularly those used as interior decorative materials for automobiles, made of a thermoplastic elastomer having a light weight and non-polluting can be provided.

In the present invention, the powder molding method includes molding methods such as the flow dipping method, the electrostatic coating method, the flame spray coating method, and the powder rotational molding method, but does not include the powder slush molding method described in the scope of claim for patent in Japanese Unexamined Patent Publication (Kokai) No. 58-132507.

Namely, the powder molding method of the present invention does not include the following powder slush molding method, comprising the steps of fixing a vessel having an opening and containing a necessary amount of a thermoplastic elastomer powder to a mold having an opening heated to a temperature sufficiently higher than the melting temperature of the thermoplastic elastomer powder with the openings being matched to each other or fixing the vessel in the hollow portion of the mold to be integrated, quickly feeding the powder to the respective portions within the mold while the mold is rotated and/or rocked, to cause the powder to be melded and adhered thereto, and if necessary, discharging the superfluous powder into the vessel.

The mold heating system to be used in the present invention includes the gas-fired furnace system, heated oil circulation system, dipping into a heated oil or a hot fluidized sand, and a high frequency induction heating system.

The thermoplastic elastomer powder to be used in this powder molding method must have a high powder flowability under a low shear rate and a low pressure, and be easily melted by the heat supplied primarily from the mold.

The specific feature of the present invention resides in an elastomer composition having a certain specific viscoelasticity comprising mixtures of ethylene-α-olefin copolymer rubbers and polyolefin resins, optionally dynamically partially crosslinked there with in the presence of a crosslinking agent, and in the use of a thermoplastic elastomer powder obtained by powdering said elastomer composition at a lower temperature than the glass transition temperature. By the use of said thermoplastic elastomer powder it has become possible to carry out a molding requiring a high flowability under a low shear rate as such a powder molding method e.g., a powder rotational molding method.

The ethylene-α-olefin copolymer rubber used in the present invention includes rubbers composed mainly of olefins including, ethylene-propylene copolymer rubbers, ethylene-propylene-nonconjugated diene copolymer rubbers, ethylene-butene-1 copolymer rubbers, ethylene-butene-1-nonconjugated diene copolymer rubbers and the like. Examples of nonconjugated dienes preferably usable include dicyclopentadiene, ethylidenenorbornene, 1,4-hexadiene, cyclooctadiene, methylene-norbornene and the like, and among them, an ethylene-propylene-ethylidenenorbornene rubber (hereinafter abbreviated EPDM) provides an elastomer powder having a high heat resistance and superior tensile characteristics. Particularly, an oil-extended olefin copolymer rubber containing 30 to 120 parts by weight of a mineral oil type softener such as paraffinic process oil per 100 parts by weight of an ethylene-α-olefin copolymer rubber having a Mooney viscosity ($ML_{1+4}$ 100° C.) of 130 to 350, preferably 200 to 300, as measured at 100° C. according to ASTM D-927-57T, is preferable since a good balance between the tensile characteristics and the flowability can be obtained.

As the polyolefin resin, polypropylenes or copolymers of propylene with α-olefins are preferably used. Particularly, the use of a copolymer resin of propylene and an α-olefin enables the hardness of the molding to be lowered. Preferably, propylene-ethylene random or block copolymer resins, propylene-butene-1 random or block copolymers resins may be employed. Preferably the polyolefin resin has a melt flow rate (MFR) of 20 g/10 min. or more, more preferably 50 g/10 min. or more, as measured at 230° C. under a load of 2.16 kg according to JIS K-7210. A thermoplastic elastomer powder prepared by using a polyolefin resin with a melt flow rate of less than 20 g/10 min. cannot provide a molding having a high strength, because the powder is only softened during powder molding, and therefore, it is difficult to cause the powder particles to be melted and adhered to each other. The formulation ratio of the ethylene-α-olefin copolymer rubber to the polyolefin resin is preferably 5% by weight to 80% by weight, more preferably 20% by weight to 80% by weight of the ethylene-α-olefin copolymer rubber and preferably 20% by weight to 95% by weight, more preferably 20% by weight to 80% by weight of the polyolefin resin, when the total amount of the both components is 100% by weight.

An organic peroxide is preferably employed as the crosslinking agent which dynamically crosslinks the mixture of the ethylene-α-olefin copolymer rubber and the polyolefin resin, and a dialkyl peroxide is preferably employed as the organic peroxide. More preferably, an extremely small amount of an organic peroxide is employed in the presence of a crosslinking coagent such as a bismaleimide compound, to effect a dynamic crosslinking. This enables the ethylene-α-olefin copolymer to be adequately crosslinked to provide a high heat resistance, and at the same time, a high flowability. In this case, the crosslinking coagent is preferably used in an amount of 1.5 part by weight or less, more preferably 0.6 part by weight or less, per 100 parts by weight of the mixture of the ethylene-α-olefin copolymer rubber and the polyolefin resin. The organic peroxide as the crosslinking agent is preferably also used in an amount of preferably 0.4 part by weight or less, more preferably 0.1 part by weight or less, most preferably 0.07 part by weight or less.

As the apparatus to be used for the dynamic crosslinking, a continuous kneading extruder such as a single screw extruder or a twin screw extruder is preferably used. Particularly, it is preferable to effect a continuous extrusion crosslinking at a maximum shear rate $\dot{\gamma}$ max $\geq 10^3$ sec$^{-1}$ by using a twin screw extruder. If the extrusion crosslinking is effected at $\dot{\gamma}$ max $< 10^3$ sec$^{-1}$, the size of the dispersed particles of the ethylene-α-olefin copolymer rubber becomes too large, and thus it unpreferably causes a poor appearance.

The present elastomer composition has a complex dynamic viscosity $\eta^*(1)$ measured at a frequency of 1 radian/sec. in a dynamic viscoelasticity measurement at 250° C. of $1.5 \times 10^5$ poise or less, preferably $1.0 \times 10^5$ poise or less, and more preferably $3.0 \times 10^4$ poise or less.

If the complex dynamic viscosity $\eta^*(1)$ measured at a frequency of 1 radian/sec. exceeds $1.5 \times 10^5$ poise, the elastomer powder prepared by using such an elastomer composition will not be melted and adhered to the mold surface, and thus the molding such as the powder molding under an extremely low shear rate of 1/sec $^{-1}$ cannot be effected by use of said elastmer powder.

The present elastomer composition has a Newtonian viscosity index n calculated from the following formula by using the complex dynamic viscosity $\eta^*(1)$ at a frequency of 1 radian/sec. and the complex dynamic viscosity $\eta^*(100)$ at a frequency of 100 radian/sec. of 0.67 or less, preferably 0.60 or less, and more preferably 0.53 or less in the dynamic viscoelasticity measurement at 250° C.:

$$n = \{log\eta^*(1) - log\eta^*(100)\}/2.$$

If the Newtonian viscosity index n exceeds 0.67, even if the complex viscosity $\eta^*(1)$ is $1.5 \times 10^5$ poise or less, the dependency of the complex dynamic viscosity on the frequency becomes greater, and thus a mutual thermal fusion between the molten elastomer powder particles is not completed in a powder molding under a very low shear rate of 1/sec or less and a very low pressure of 1 kg/cm$^2$ or less, and such a powder molding produces only moldings having a low mechanical strength.

In the present invention, the molding obtained by using the thermoplastic elastomer powder has a hardness (shore D) of 45 or less.

If the hardness (shore D) exceeds 45, the molding becomes too hard and gives not only an undesirable hard feeling, but also an undesirably poor protection of occupants of a vehicle during a collision when used as covering material for interior decorative of an automobile.

In the present invention, preferably the elastomer composition is pulverized by the freezing pulverization method using liquid $N_2$. Pellets of the elastomer composition cooled to a pulverizing temperature of $-40°$ C. or lower, preferably $-70°$ C. or lower, more preferably $-90°$ C. or lower, can be obtained by a mechanical pulverization method using a hammer mill, pin mill, etc.

If the composition is pulverized at a temperature higher than $-40°$ C., the particle sizes of the pulverized elastomer powder are coarsened, and thus the powder moldability is undesirably lowered. To prevent an elevation of the polymer temperature to the glass transition temperature or higher during the pulverization operation, preferably a method having little heat generation and a high pulverization efficiency is employed.

Also, preferably a pulverization apparatus which is cooled by an external cooling source is employed.

The elastomer powder obtained is preferably pulverized to the extent such that 95% or more of the total weight passes through a 32 mesh Tyler standard sieve. If the accumulation ratio on the 32 mesh sieve exceeds 5%, thickness irregularities are generated during the powder molding. These thickness irregularities cause irregularities to the flexibility of the molding whereby, for example, bending wrinkles are formed, and lower the commercial value of the molding.

An organic or inorganic fine particulate powder can be added to the elastomer powder of the present invention, to prevent reagglomeration (mutual adhesion). This addition can be made before or after the classification, but an addition before the classification is preferable because the classification and blending operations thus can be performed at the same time.

The organic or inorganic fine particulate powder is a fine powder having an average particle size of 50 μm or less and having a higher glass transition temperature or higher melting temperature than room temperature. For example, there are included polyolefin resin powder, talc, kaolin, silicon oxide, and alumina oxide, but a polyolefin resin powder is particularly preferable in that the thermal fusion strength between the elastomer powder particles is not lowered during the molding. The polyolefin resin as the mutual adhesion preventive agent is preferably added in an amount of from 0.2 to 20 parts by weight based on 100 parts by weight of the elastomer powder. If this amount is less than 0.2 part by weight, it is slightly difficult to prevent a mutual adhesion, and if more than 20 parts by weight, the flexibility is undesirably impaired. Therefore, more preferably this amount is 0.5 to 15 parts by weight.

The elastomer composition of the present invention can be formed into an elastomer composition having a excellent flexibility by blending an uncrosslinked ethylene-α-olefin copolymer rubber or a polyolefin resin in an amount of 50 parts by weight or lesss based on 100 parts by weight of the partially crosslinked type elastomer composition. As the α-olefin, propylene and butene-1 may be used alone or in combination. Particularly, an ethylene-propylene copolymer rubber, ethylene-butene-1 copolymer rubber, ethylene-propylenenonconjugated diene copolymer rubber or ethylene-butene 1-nonconjugated dience copolymer rubber with an ethylene content of 40 to 90% by weight, preferably 70 to 85% by weight, having a $ML_{1+4}100°$ C. of 50 or less is employed.

During the demolding of the powder molded product by an elastomer powder, the adhesion thereof to the inner mold surface is sometimes strong, and thus defects such as bending wrinkles or whitening may be generated when the demolding is forcibly attempted. Accordingly, it is often necessary before molding to coat the inner mold surface with a mold release agent, such as dimethylpolysiloxane. For a continuous production of many moldings, however, the mold release agent must be coated for every few moldings, which will lead to increased costs. In such a case, although an improvement of the mold material is possible, the method of adding 2 parts by weight or less of a methylpolysiloxane compound as the internally added mold release agent per 100 parts by weight of the elastomer composition or the elastomer powder is effective. The addition in this case may be made either before or after the powdering. In this case, a methylpolysiloxane compound having a viscosity at 25° C. of 20 centistokes or more may be employed. The preferable viscosity range is 50 to 5000 centistokes; if the viscosity is too high, the effect of the mold release agent is reduced. On the other hand, if the amount of the internally added mold release agent is larger than 2 parts by weight, the thermal fusion between the elastomer powder particles is inhibited and only a molding having a low mechanical strength can be obtained. Also, the internally added mold release agent often bleeds out onto the mold surface, the mold is undesirably contaminated. Further, by controlling the amount of the internally added mold release agent, the reagglomeration after powdering can be avoided.

In the present invention, known heat-resistant stabilizers such as phenol type, sulfite type, phenylalkane type, phosphite type, amine type or amide type stabilizers, antioxidants, weathering resistant stabilizers, antistatic agents, metal soaps, lubricants such as waxes, and pigments for coloration can be formulated in necessary amounts.

The molded articles according to the present invention can be applicable as products in the following various application fields.

In the automobile fields, for example, various automobile parts including interior cover materials of, for example, instrument panels, console boxes, arm rests, head rests, door trims, rear panels, pillar trims, sunvisors, trunk room trims, trunk lid trims, air bag covers, seat buckles, head liners, gloves boxes and stearing wheel covers; interior molded articles of, for example, kicking plates and change lever boots; exterior parts, for example, spoilers, side moles, number plate housings, mirror housings, air dam skirts and mud guards; and other molded articles of automobile parts.

In the electric home appliance and office automation device fields, housings and covering materials of the housings for, for example, television sets, video sets, washing machines, dryers, cleaners, coolers, air-conditioners, remote controller cases, electronic ovens, toasters, coffee makers, pots, thermoses, dish washers, electric razors, hair dryers, microphones, head phones, beauty appliances, compact disk cases, cassette tape cases, personal computers, typewriters, light projectors, telephones, copying machines, facsimile machines, telex machines, etc.

In the sport good fields, decorative parts of sport shoes, grips of rackets, sport tools and goods of various ball games, covering materials of saddles and handlebar grips of bicycles, motor-cycles and tricycles, etc.

In the housing and building fields, covering materials of furnitures, desks, chairs, etc.; covering materials of gates, doors, fences, etc.; wall decorative materials; covering materials of curtain walls; indoor flooring materials of kitchens, washrooms, toilets, etc.; outdoor flooring materials such as verandas, terraces, balconies, carports, etc.; carpets such as front door or entrance mats, table cloths, coasters, ash tray doilys.

In the industrial part fields, grips and hoses for electric tools, etc., and the covering materials thereof; packing materials.

In other fields, covering materials of bags, briefcases, cases, files, pocket books, albums, stationarys, camera bodies, dolls and the other toys, and molded articles such as watch bands, outer frames of picture or photograph and their covering materials.

EXAMPLES

The present invention will now be further illustrated by, but is by no means limited to, the following Examples.

The dynamic viscoelasticity, powder properties, moldability, and tensile properties of the molded sheet of the elastomer compositions or the thermoplastic elastomer powders in Examples and Comparative Examples were measured by the following methods.

DYNAMIC VISCOELASTICITY OF ELASTOMER COMPOSITION

Using a dynamic analyzer Model RDS-7700 manufactured by Rheometrics Co., the dynamic viscoelasticities at vibration frequencies of 1 radian/sec. and 100 radian/sec. were measured, and the complex dynamic viscosities $\eta^*(1)$ and $\eta^*(100)$ were calculated. The measurements were conducted in the parallel plate mode, and at an added strain of 5% and a sample temperature of 250° C.

The Newtonian viscosity index n was calculated from the following formula, on the basis of the results of $\eta^*(1)$ and $\eta^*(100)$:

$$n = \{log\eta^*(1) - log\eta^*(100)\}/2.$$

FLOWABILITY OF THERMOPLASTIC ELASTOMER POWDER

An amount of 100 ml of the thermoplastic elastomer powder was charged in the funnel of the bulk specific gravity measuring device designated by JIS K-6721, the dumper withdrawn, and the time (seconds) from the start of the powder dropping until all the powder had dropped was measured.

The best powder flowability is that wherein the dropping is finished in the shortest time.

PRELIMINARY EVALUATION OF POWDER MOLDABILITY OF THERMOPLASTIC ELASTOMER POWDER

(1) Powder moldability

An amount of 500 g of the elastomer powder was fed onto a nickel electroformed embossed plate having a size of 30 cm × 30 cm and a thickness of 3 mm, heated to a surface temperature of 250° C., and adhered for 14 seconds, followed by a discharge of unadhered powder of said elastomer powder, and the powder adhered on embossed plate was heated and melted in a heating furnace under an atmosphere temperature of 280° C. for 60 seconds. The powder moldability was preliminary evaluated according to the following standards, from the fused state of the powder on the mold and the properties of the molded sheet obtained by demolding after water cooling the mold to 70° C.:

ⓒ: powder particles were sufficiently mutually fused, and the tensile strength of the molded sheet was sufficiently high.

o : powder particles were sufficiently mutually fused, and the tensile strength of the molded sheet was high.

Δ: powder particles were mutually fused, but the tensile strength of the molded sheet obtained was low and the molded sheet was brittle.

x : powder particles were not mutually fused, and powder remained on the mold.

ⓒ and o can be powder molded to obtain a final product, but Δ and x cannot be powder molded to obtain same.

(2) Demolding force

An amount of 250 g of the elastomer powder was fed onto a nickel electroformed embossed plate having a size of 150 mm × 300 mm and a thickness of 3 mm, heated to a surface temperature of 270° C., and adhered for 15 seconds, followed by a discharge of unadhered powder of said elastomer powder, and the powder adhered embossed plate was heated and melted in a heating furnace under an atmosphere temperature of 280° C. for 60 seconds. Then, the mold temperature was cooled to 700° C., at which a mold release was effected. This operation was repeated 10 times, and at the 10th mold release, the demolding force (peeling strength) between the molded sheet and the mold was measured by using a spring weighing scale. The best demoldability is exhibited at the smallest demolding force per width of 125 mm.

PHYSICAL PROPERTIES OF MOLDED SHEET

The molded sheet obtained in the preliminary evaluation of the powder moldability test was punched to a form a No. 1 dumbbell test sample as described in JIS K-6301, conditioned under the conditions of 23° C., 50% RH for 24 hours, and then a tensile test was conducted under the same conditions by a tensile tester at a tensile speed of 200 mm/min. to measure the tensile strength at break and the elongation at break.

The hardness was measured by shore D.

EXAMPLE 1

A mixture of 50 parts by weight of an oil-extended EPDM ($ML_{1+4}$100° C.=53) obtained by adding 100 parts by weight of a mineral oil type softener (Idemitsu Kosan, Co., Ltd. Dianaprocess ® PW-380) to 100 parts by weight of an EPDM ($ML_{1+4}$ 100° C. =242, propylene content =28% by weight, iodine value=12), 50 parts by weight of a propylene-ethylene random copolymer resin (ethylene content =3% by weight, MFR=60 g/10 min.) and 0.4 parts by weight of a cross-linking coagent (Sumifine® BM-bismaleimide compound, manufactured by Sumitomo® Chemical Co., Ltd.) was kneaded by a Banbury mixer (for 10 minutes), then formed by an extruder into a masterbatch (hereinafter written as M.B.) for crosslinking, in the shape of pellets.

To 100 parts by weight of the M.B. was added 0.04 part by weight of an organic peroxide (Sanperox® APO, manufactured by Sanken Chemical Co., Ltd), and a dynamic crosslinking was carried out at 220° C. by a twin screw extruder (TEX ®-44, manufactured by The Japan Steel Works LTD.) to obtain elastomer composition pellets. The elastomer composition pellets were cooled at a temperature of −100° C. by liquid $N_2$, and then freeze-pulverized to obtain a thermoplastic elastomer powder. The powder passed through a 32 mesh Tyler standard sieve at a ratio of 99% by weight.

This powder was used for a preliminary evaluation of the powder moldability. The results are shown in Table 1.

Also, 150 g of the thermoplastic elastomer powder was charged into a powder rotational molding mold for a head rest covering as an interior decorative of an automobile, which was mounted on a twin axis rotatory apparatus stand, and the mold was rotated on its axis at a rotation rate and a revolution rate both of 15 r.p.m. in a heated furnace at 300° C., and the rotation was stopped when the mold surface temperature reached 280° C. The mold was then immediately cooled with water and the molded sheet demolded. The molded sheet obtained by the powder rotational molding was found to have a weight of 150 g, a thickness of 1.4 to 1.6 mm, and no defects, and having an excellent uniformity of the thickness thereof with a strong tensile strength and tear strength, and without pinholes.

COMPARATIVE EXAMPLE 1

Using the same formulation and under the same conditions as in Example 1, except for using 70 parts by weight of the oil-extended FPDM and 30 parts by weight of a different propylene-ethylene random copolymer resin (MFR of=1.2 g/10 min.) in Example 1, a thermoplastic elastomer powder was obtained. The elastomer powder passed through the 32 mesh sieve at a ratio of 99% by weight.

Using this thermoplastic elastomer powder, the powder moldability was preliminary evaluated in the same manner as in Example 1. The results are shown in Table 1.

Also, a powder rotational molding was carried out in the same manner as in Example 1, but as a result, the powder particles were not fused to each other and only a molded sheet which easily crumbled was obtained.

The molded sheet was found to have an extremely non-uniform thickness and a very low tensile strength and tear strength.

TABLE 1

|  | Example 1 | Comparative Example 1 |
| --- | --- | --- |
| Dynamic viscoelasticity of elastomer composition |  |  |
| $\eta^*(1)$ [poise] | $1.6 \times 10^4$ | $1.9 \times 10^5$ |
| $\eta^*(100)$ [poise] | $1.8 \times 10^3$ | $8.0 \times 10^3$ |
| Newtonian viscosity index n | 0.48 | 0.69 |
| Powder properties |  |  |
| Powder flowability [sec] | 24 | 31 |
| Moldability |  |  |
| Powder moldability | ⓒ | Δ |
| Demolding force [g/125 mm width] | 380 | Unmeasurable |
| Physical properties of molded sheet |  |  |
| Tensile Strength at break [kg/cm$^2$] | 124 | 10 |
| Elongation at break [%] | 580 | 25 |
| Hardness (Shore D) | 41 | 29 |

EXAMPLE 2

A thermoplastic elastomer powder was obtained under the same formulation and under the same conditions as in Example 1, except for using 40 parts by weight of the oil-extended EPDM, 60 parts by weight of propylene-butene-1 random copolymer resin (butene-1 content=24.4 wt.%, MFR=92g/10min.) instead of the propylene-ethylene random copolymer resin and further 0.2 parts by weight, based on 100 parts by weight of the total amount of the above-mentioned resin and EPDM, of a mold release agent (SH-200 manufactured by Toray Silicone Co., Ltd, the viscosity at 25° C.=100 centistokes) in the preparation of M.B in Example 1. The powder passed through a 32 mesh Tyler standard sieve sieve at a ratio of 99% by weight.

The powder obtained above was used for a preliminary evaluation of the powder moldability. The results are shown in Table 2.

The powder rotational molding was also effected using the above powder in the same manner as in Example 1. The molded sheet thus obtained was found to have a weight of 150 g, a thickness of 1.4 to 1.6 mm, and no defects, and having an excellent uniformity of the thickness thereof with a strong tensile strength and tear strength, and without pinholes.

COMPARATIVE EXAMPLE 2

Component A: Ethylene-propylene-ethylidenenorbornene interpolymer rubber having a ethylene-/propylene unit ratio (weight) of 78/22, an iodine value of 12, and a Mooney viscosity (ML$_{1+4}$, 121° C.) of 55

Component B: Isotactic polypropylene resin having a melt index of 13 g/10 min (230° C.)

Component C: Naphthenic process oil

Component D: Mixture of 20% by weight of 1,3-bis (tert-butylperoxyisopropyl) benzene, 30% by weight of divinylbenzene and 50% by weight of paraffinic mineral oil A 55 parts by weight of the above-mentioned component A, 45 parts by weight of the component B and 30 parts by weight of the components C were kneaded at a temperature of 180° C. for 5 minutes by a Banbury mixer and the resultant mixture was cut by a sheet cutter to form pellets.

A 100 parts by weight of the pellets obtained above was mixed with one part by weight of the component D in a Henschel mixer and the mixture was extruded at 220° C. through a twin screw extruder (TEX ®-44, manufactured by Japan Steel Works Ltd.) to obtain the thermoplastic elastomer pellets.

The thermoplastic elastomer pellets obtained above was pulverized under the same conditions as in Example 1 to obtain the thermoplastic elastomer powder. The powder passed a 32 mesh Tyler standard sieve at a ratio of 98% by weight.

A powder rotational molding was carried out in the same manner as in Example 1, but as a result, the powder particles were not fused to each other and only a molded sheet which easily crumbled was obtained.

COMPARATIVE EXAMPLE 3

A thermoplastic elastomer powder was obtained in the same manner as in Comparative Example 2, except that the amounts of the components A and B were changed to 80 parts by weight and 20 parts by weight, respectively, and 10 parts by weight of the component E [butyl rubber (IIR 065, manufactured by Esso)) were added. This powder passed through a 32 mesh Tyler standard sieve at a ratio of 98% by weight.

A powder rotational molding was carried out in the same manner as in Example 1, but as a result, the powder particles were not fused to each other and only a molded sheet which easily crumbled was obtained.

COMPARATIVE EXAMPLE 4

A thermoplastic elastomer powder was obtained in the same manner as in Comparative Example 2, except that the component C was not used.

This powder passed through a 32 mesh Tyler standard sieve at a ratio of 98% by weight.

A powder rotational molding was carried out in the same manner as in Example 1, but as a result, the powder particles were not fused to each other and only a molded sheet which easily crumbled was obtained.

TABLE 2

|  | Example 2 |
| --- | --- |
| Dynamic viscoelasticity of elastomer composition |  |
| $\eta^*(1)$ [poise] | $6.8 \times 10^3$ |
| $\eta^*(100)$ [poise] | $1.2 \times 10^3$ |
| Newtonian viscosity index n | 0.38 |
| Powder properties |  |
| Powder flowability [sec] | 24 |
| Moldability |  |
| Powder moldability | ⓒ |
| Demolding force [g/125 mm width] | 150 |
| Physical properties of molded sheet |  |
| Tensile Strength at break [kg/cm$^2$] | 140 |
| Elongation at break [%] | 640 |
| Hardness (Shore D) | 41 |

As described above, according to the present invention, there can be provided a thermoplastic elastomer powder for powder molding which can obtain a molding having a sufficiently high thermal fusion strength between powder particles, without pinholes, by using a thermoplastic elastomer powder having a high flowability even when substantially no forming pressure is applied, a powder molding method using the same, and molded articles thereof.

We claim:

1. A thermoplastic elastomer powder for powder molding, comprising a partially crosslinked type elastomer composition comprising a mixture of an ethylene-α-olefin copolymer rubber and a polyolefin ethylene resin dynamically crosslinked in the presence of a crosslinking agent, wherein said elastomer composition has a complex dynamic viscosity $\eta^*(1)$ as measured at frequency of 1 radian/sec. in dynamic viscoelasticity measurement at 250° C., of $1.5 \times 10^5$ poise or less, a Newtonian viscosity index n calculated from the following formula by using the complex dynamic viscosity $\eta^*(1)$ at a frequency of 1 radian/sec. and the complex dynamic viscosity $\eta^*(100)$ at a frequency of 100 radian/sec. of 0.67 or less, and a hardness (shore D) of 45 or less:

$n = \{log\eta^*(1) - log\eta^*(100)\}/2.$

2. A thermoplastic elastomer powder as claimed in claim 1, wherein the ethylene-a-olefin copolymer rubber is an ethylene-propylene-nonconjugated diene copolymer rubber.

3. A thermoplastic elastomer powder as claimed in claim 1, wherein the ethylene-a-olefin copolymer rubber is an oil-extended olefin copolymer rubber comprising 30 to 120 parts by weight of a mineral oil type softener formulated per 100 parts by weight of an ethylene-α-olefin copolymer rubber having a Mooney viscosity $(ML_{1+4} 100° C.)$ of 130 to 350 as measured at 100° C. according to ASTM D-927-57T.

4. A thermoplastic elastomer powder as claimed in claim 1, wherein the polyolefin resin is a polypropylene or a copolymer of propylene and an α-olefin.

5. A thermoplastic elastomer powder as claimed in claim 1, wherein the polyolefin resin is a polyolefin resin having a melt flow rate (MFR) of 20 g/10 min. or more as measured at 230° C. under a load of 2.16 kg according to JIS K-7210.

6. A thermoplastic elastomer powder as claimed in claim 1, wherein a crosslinking coagent is used in combination in a dynamic crosslinking.

7. A thermoplastic elastomer powder as claimed in claim 1, wherein the crosslinking agent is an organic peroxide.

8. A thermoplastic elastomer powder as claimed in claim 1, wherein the crosslinking agent is a dialkyl peroxide.

9. A thermoplastic elastomer powder as claimed in claim 6, wherein the crosslinking coagent is a bismaleimide compound.

10. A thermoplastic elastomer powder, comprising 0.2 to 20 parts by weight of a polyolefin resin powder added as a mutual adhesion preventive agent based on 100 parts by weight of the elastomer powder according to claim 1.

11. A thermoplastic elastomer powder, comprising 50 parts by weight or less of an ethylene-α-olefin copolymer rubber and/or a polyolefin resin blended based on 100 parts by weight of the elastomer composition according to claim 1.

12. A thermoplastic elastomer powder, comprising 2 parts by weight or less of a methylpolysiloxane compound added based on 100 parts by weight of the elastomer composition or the elastomer powder according to claim 1.

13. A thermoplastic elastomer powder as claimed in claim 12, wherein the methylpolysiloxane compound is a methylpolysiloxane compound having a viscosity at 25° C. of 20 centistokes or more.

14. A thermoplastic elastomer powder as claimed in claim 12, wherein the methylpolysiloxane compound is dimethylpolysiloxane.

15. A thermoplastic elastomer powder as claimed in claim 1, which is pulverized until 95% by weight or more thereof passes through a 32 mesh Tyler standard sieve.

* * * * *